Patented Sept. 25, 1934

1,974,847

UNITED STATES PATENT OFFICE 1,974,847

PROCESS FOR CURING CHEESE

Emery Fox Goss and Bernard Wernick Hammer, Ames, Iowa, assignors to Iowa State College of Agriculture and Mechanic Arts, Ames, Iowa, a corporation of Iowa No Drawing. Application January 18, 1933,
Serial No. 652,417

3 Claims. (Cl. 99—8)

This invention relates to the curing or ripening of cheese and has for one of its objects the elimination of the loss of moisture during the curing or ripening period of the cheese.

A further object of our invention is to prevent the growth of microorganisms in and on the cheese and to prevent molds upon the surface of the cheese during the curing of the same.

A still further object of this process of curing cheese is to provide a method of hastening the ripening and curing process of the cheese at normal curing or ripening temperatures.

A still further object of our invention is to provide a process of curing cheese that will facilitate the successful placing of cured cheese in small retail packages.

A still further object of this invention is to provide a process of curing cheese that prevents the rind formation during the curing process.

A still further object of our invention is to provide a process of curing cheese that permits the gases formed during the cheese ripening to escape as formed, even though the cheese itself is sealed from the air.

These and other objects will be apparent to those skilled in the art.

The manufacture of cheese is very old and well known. The usual method of making cheese, after it has been pressed into suitable form is to dip it into melted paraffin. The objection to paraffin is that if a sufficiently thick layer is employed the paraffin will crack off readily in handling. Also, in many instances, the paraffin will separate from the cheese and in any event the protection of the cheese is generally imperfect and a substantial amount of drying of the cheese occurs, which is highly undesirable. Usually, in an effort to secure a layer of paraffin sufficiently thin to be flexible and tenacious, the coating of the paraffin is so thin and inadequate as to permit the excessive drying of the cheese. Another objection to the conventional method of curing cheese in paraffin wax is the fact that the surface must be dry when the wax is applied or so-called "rind rot" or mold develops under the paraffin, damaging the commercial qualities of the cheese. Still another objection to the use of paraffin wax in the curing of cheese is that the paraffin does not permit the gases formed during the cheese ripening to escape after formed, thereby resulting in slow ripening and cheese of inferior quality.

As will be herein appreciated, our process commences immediately after the cheese has been removed from the pressing molds. It is not necessary to completely dry the surface of the cheese as it comes from the molds and before being subjected to our process of curing. This immediate placing of the cheese into the treating process eliminates the loss of moisture in the cheese to a minimum and is easily distinguished from the paraffin method of curing cheese where it is necessary to thoroughly dry the surface of the cheese before the paraffin is applied.

Our process of curing and ripening cheese consists of subjecting the cheese to the usual curing room temperatures, during which time the cheese is immersed in an oil liquid. Any oil liquid may be used, provided it is heavy-bodied, odorless, tasteless, and colorless. We have found that mineral oils such as are used for internal use are highly satisfactory. Other oils, of course, may be used if there is no deleterious effect upon the qualities of the cheese when cured.

Any suitable container for holding the oil may be used. Again referring to the immediate placing of the cheese from the mold into the oil it is recommended that the press cloths be removed from the cheese at once before there is any opportunity for appreciable surface drying of cloth or cheese. If there be any surface moisture on the cheese it may be removed from the same by placing the cheese surfaces in momentary contact with other clean dry press cloths of muslin or like which have been spread flat upon the table. Following the removal of the loose moisture from the surface of the cheese, the cheese is then immediately placed in the containers holding the oil. The dimensions of the cheeses and the height of the oil in the container should be such that the cheeses are substantially covered by the liquid. By this it will be seen that the cheeses are completely surrounded and submerged in the oil. The containers holding the oil and cheese are now placed in cold storage rooms at forty-five degrees Fahrenheit, or other suitable curing temperatures. Since the length of the curing period will vary with the character of the original cheese, the intensity of the cheese flavor desired, as well as the temperature of the curing room, the length of the curing period will vary from two weeks to as much as two years.

At the end of the length of time chosen as the curing period the cheeses are removed from the oil by any suitable method such as depositing on a fine mesh flat strainer surface through which the surplus oil drains. Any remaining surplus oil on the surface of the cheese may be removed by blotting with absorbent material. After the cheeses have been cleaned of all surface oil they are ready to be wrapped or otherwise prepared for shipment and for the market.

Our process is especially desirable in the case of smaller styles of cheese which have heretofore been particularly difficult to cure properly. Although it is not recommended, the cheese may be previously wrapped or coated before it is placed in the oil for ripening purposes.

When our process is used there is little loss of moisture or weight of the cheese during the curing and ripening of the same. It will also be noted that by the cheese being completely surrounded by an oil liquid the growth of microorganisms is discouraged and molds are prevented from forming on the surface of the cheese. This is made possible by denying the atmosphere to the cheese during the ripening process. When the cheese is removed from the oil it will be found that no undesirable rind formation has formed on the cheese during its curing process. This also aids in permitting gases to escape easily to the outer surface of the cheese. These gases when formed, of course, may pass upwardly and escape through the surrounding oil.

From the loss of weight standpoint during the curing process, we compare our process with the paraffin wax process as follows:

| Lot | Initial wt. | After one month | After two months | Percent loss after two months |
|---|---|---|---|---|
| 85 Paraffin | 1095.1 | 1072.7 | | |
|  | 1176.9 | | 1136.3 | 2.5 |
| Oil | 1152.9 | 1140.9 | | |
|  | 1118.8 | | 1119.1 | 0 |
| 89 Paraffin | 1216.5 | 1197.4 | | |
|  | 1152.8 | | 1131.7 | 1.83 |
| Oil | 1113.3 | 1123.0 | | |
|  | 1210.1 | | 1210.5 | 0 |
| 91 Paraffin | 1199.4 | 1185.0 | | |
|  | 1143.9 | | 1116.1 | 2.4 |
| Oil | 1211.1 | 1198.1 | | |
|  | 1156.8 | | 1153.3 | .3 |

Improvement in quality of cheese cured in oil as compared with cheese cured in a coating of paraffin wax is evidenced by the following scores of:

| Lot | One month | | Two months | |
|---|---|---|---|---|
|  | Flavor | Body and texture | Flavor | Body and texture |
| 85 Paraffin | 37 | 27.5 | 38.5 | 28 |
| Oil | 39 | 28 | 39.5 | 29 |
| 89 Paraffin | 38 | 28 | 38 | 28 |
| Oil | 37.5 | 28 | 38.5 | 28.5 |
| 91 Paraffin | 38 | 28 | 39 | 28 |
| Oil | 38 | 28 | 39 | 29 |

In experimenting with the different kinds of oil that may be used in our process we have also found that inert liquids such as paraffin oil may be used to advantage.

We claim as our invention:

1. The process of curing and ripening cheese consisting of taking uncured or green cheese directly from the press and immersing and maintaining the same in oil until cured or ripened.

2. The process of curing and treating cheese consisting of the taking of previously pressed uncured or green cheese and the immersing and maintaining of the same in mineral oil until suitably cured.

3. The process of curing and treating cheese, consisting of taking uncured or green cheese from the press, the preparing of a receptacle of oil, and the placing of said cheese in said receptacle and below the surface of said oil until cured.

EMERY FOX GOSS.
BERNARD WERNICK HAMMER.